Figure 1:
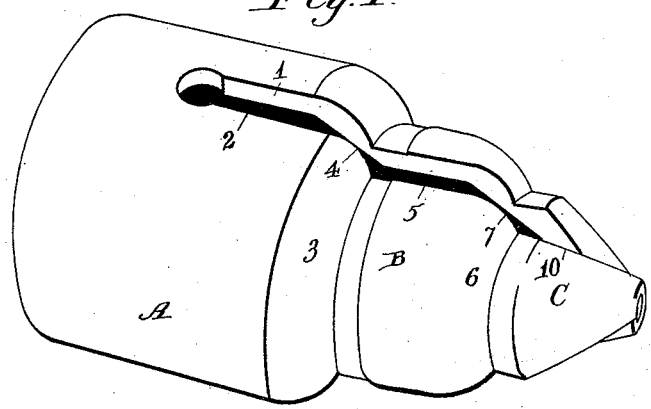

(No Model.)

J. M. CHESNUT.
REAMER.

No. 469,057. Patented Feb. 16, 1892.

Witnesses:
Louise M. Low
J. M. Copenhaver.

Inventor:
J. M. Chesnut.
by H. N. Low atty.

UNITED STATES PATENT OFFICE.

JAMES M. CHESNUT, OF WILLIAMSPORT, PENNSYLVANIA.

REAMER.

SPECIFICATION forming part of Letters Patent No. 469,057, dated February 16, 1892.

Application filed July 22, 1891. Serial No. 400,347. (No model.)

*To all whom it may concern:*

Be it known that I, JAMES M. CHESNUT, a citizen of the United States, residing at Williamsport, in the county of Lycoming and State of Pennsylvania, have invented certain new and useful Improvements in Reamers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

It is the object of my invention to provide a reamer which is not only simple in construction and economical in its manufacture, but one which especially is adapted to run at high speeds and to permit and assist in the removal of the shavings which rapidly accumulate or are produced by its action at or near the front end of the tool.

My improved reamer is especially designed for the production of wooden pipes or conduits of comparatively large internal diameter—say from one inch to six inches—which are used for pumps and for the underground conduction of telephone, telegraph, and other electric wires. In producing such tubing a stick of wood of the proper size and length is selected, which is bored from each end to the middle by an ordinary auger of comparatively small diameter. In most instances the two holes thus made will not be in line with each other at their point of meeting in the middle of the stick, and consequently difficulty is encountered when the reaming-tool subsequently introduced into the small auger-hole reaches such point, the reamer often choking and failing to remove with the requisite rapidity the greater quantity of wood which must there be cut at one side of the hole.

Reaming-tools have heretofore been made with a leader attached to the front end of the reamer and designed to follow the auger-hole; but proper provision has not been made for the escape of the shavings produced by the leader. According to my invention the leader is made hollow and open or unobstructed at its center and has delivery-passages for the shavings extending in a radial direction inward from the cutting-edges of the leader to said central open space or hollow, which space is clear for the discharge of the chips or shavings, the leader being furthermore secured to the main body of the reamer by its (the leader's) periphery or edge, being in fact preferably made integral therewith, as hereinafter more particularly set forth.

With such objects in view my invention consists in the parts and combinations thereof hereinafter more particularly set forth and claimed.

In order to make my improvement more clearly understood I have shown in the accompanying drawings means for carrying the same into practical effect without, however, intending to limit my invention to the exact construction which, for the sake of illustration, I have delineated.

Figure 2:
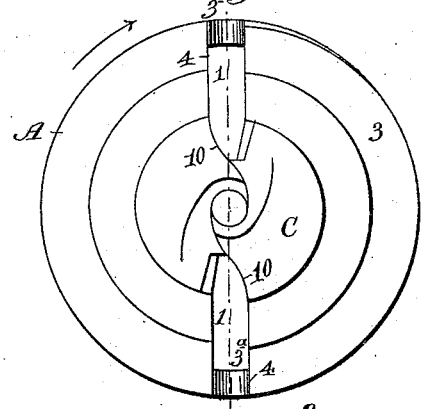
Figure 3:
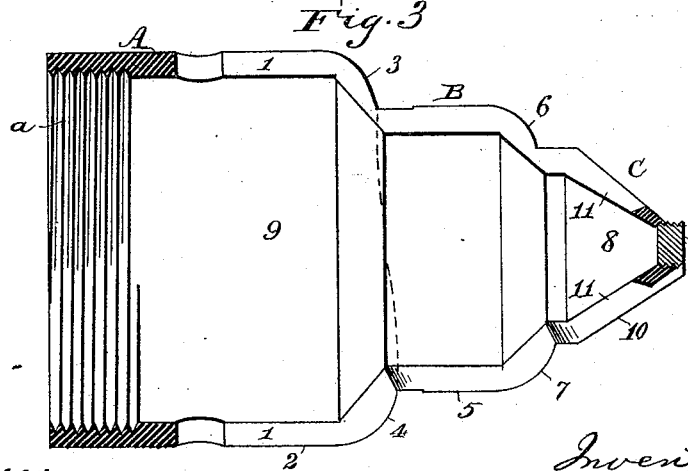

In said drawings, Figure 1 is a perspective view of a reamer embodying my improvements. Fig. 2 is a plan view of the same. Fig. 3 is a longitudinal sectional view on line $3^a$ $3^a$ of Fig. 2.

Referring to the drawings, A indicates what may be termed the "base" of the reamer, which is provided with suitable means for securing it to the ordinary mandrel, such as the screw-thread $a$. The part A, which is the largest portion of the reamer, is provided with slots 1, at one side of which are formed the cutting-edges 2. At its front end the part A is rounded or beveled at 3, where are formed cutting-edges 4 of similar contour. From the said bevel the reamer continues in cylindrical form, this part being indicated at B and being preferably of a radius about three-eighths of an inch less than the part A. The slots 1 continue through the part B and are formed with cutting-edges 5. At its forward end the part B is rounded at 6, where there are formed at opposite sides of the said slot cutting-edges 7 of beveled or rounded contour.

The parts thus far described constitute the main body of the reamer, which is preferably formed in one piece of steel, as shown.

C indicates the leader, of conical shape and of a radius about three-eighths of an inch less than the part B, the dimensions herein given being suitable for a tool, the leader of which is of a diameter of an inch and a half and the largest part of which is of a diameter of three inches. Such a tool is adapted for reaming out auger-holes of an inch and a half diameter to a diameter of three inches. The base of the leader is secured to the forward end of the part B by its edge or periphery, being preferably formed integral therewith.

8 indicates a hollow space or chamber formed within the leader C, and which is a continuation of the larger space 9 within the body of the reamer.

10 indicates the cutting-edges of the leader, which are preferably continuations of the edges 7 and from which passages 11 extend radially or directly inward to the chamber 8.

When the herein-described reamer, rotating at a speed of twelve hundred to fifteen hundred revolutions per minute, is introduced into a tube, the auger-holes of which are out of line, and encounters the shoulder at the point of meeting of said holes, it will not clog, but the comparatively large quantity of shavings which will be produced at that point by the cutting-edges 10 of the leader will pass directly into the chamber 8 and thence into the space 9, from which they will be removed by the conveyer within the mandrel in the usual manner.

It will be observed that, instead of making one cut from the diameter of the leader up to the diameter of the part A, two cuts are made, each of half the total amount required, by which the shavings are distributed and danger of clogging still further avoided.

It will be found in practice that by the use of this tool a large bore can be produced at one operation from a relatively small auger-hole and a correspondingly large amount of shavings cut and removed without difficulty or danger of choking, notwithstanding inequalities which may exist in the hole to be reamed.

Having thus described my invention, what I claim is—

1. The herein-described reamer, consisting of the combination, with the main body, of the leader C, provided with the clear central hollow space and the passages leading directly from the cutting-edges into said space, substantially as set forth.

2. The herein-described reamer, consisting of the combination, with the main body, of the leader C, having the clear central hollow chamber 8, the cutting-edges 10, and the passages 11, extending radially inward to said chamber, the leader being connected by its edge or periphery with the body of the reamer, substantially as set forth.

3. The herein-described reamer, consisting of the part A, having the rounded portion 3, the part B, extending forward from the part A and having the rounded shoulder 6, and the leader C, having the clear central chamber 8, all of said parts being provided with cutting-edges, as described, and being formed in one piece, substantially as set forth.

4. The herein-described reamer, consisting of the combination, with the main body, of the leader C, provided with a clear space of a conical or flared form to facilitate the discharge of chips or shavings and passages leading directly from the cutting-edges into said space, substantially as set forth.

In testimony whereof I affix my signature in presence of two witnesses.

JAMES M. CHESNUT.

Witnesses:
J. D. CROSTHWAITS,
W. F. ELSE.